(12) United States Patent
Chiang et al.

(10) Patent No.: US 8,527,916 B1
(45) Date of Patent: Sep. 3, 2013

(54) DISSECTION SPLITTING WITH OPTICAL PROXIMITY CORRECTION TO REDUCE CORNER ROUNDING

(75) Inventors: Chia-Ping Chiang, Taipei (TW); Tsong-Hua Ou, Taipei (TW); Yu-Po Tang, Taipei (TW); Ming-Hui Chih, Luzhou (TW); Wen-Li Cheng, Taipei (TW); Cheng Kun Tsai, Hsinchu (TW); Wen-Chun Huang, Tainan (TW); Ru-Gun Liu, Zhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/419,977

(22) Filed: Mar. 14, 2012

(51) Int. Cl.
    *G06F 17/50* (2006.01)
(52) U.S. Cl.
    USPC ............................................. 716/53; 716/50
(58) Field of Classification Search
    USPC ....................................................... 716/53, 50
    See application file for complete search history.

(56) References Cited

U.S. PATENT DOCUMENTS

| | | | |
|---|---|---|---|
| 6,544,699 B1 | 4/2003 | Kim et al. | |
| 7,926,002 B2 | 4/2011 | Word et al. | |
| 7,954,071 B2 | 5/2011 | Barnes et al. | |
| 8,381,153 B2 | 2/2013 | Chiang et al. | |
| 2004/0076891 A1* | 4/2004 | Pierrat | 430/5 |
| 2005/0081179 A1* | 4/2005 | Melvin | 716/20 |
| 2008/0301611 A1* | 12/2008 | Word et al. | 716/9 |
| 2010/0064274 A1* | 3/2010 | Grimm | 716/21 |
| 2011/0191726 A1 | 8/2011 | Word et al. | |

OTHER PUBLICATIONS

Unpublished U.S. Appl. No. 12/884,442, filed Sep. 17, 2010 entitled "Dissection Splitting With Optical Proximity Correction and Mask Rule Check Enforcement", 25 pages.

* cited by examiner

*Primary Examiner* — Stacy Whitmore
*Assistant Examiner* — Magid Dimyan
(74) *Attorney, Agent, or Firm* — Haynes and Boone, LLP (57) ABSTRACT

The present disclosure provides one embodiment of an integrated circuit (IC) method. The method includes receiving an IC design layout having a main feature, the main feature including two corners and an edge spanning between the two corners; performing a feature adjustment to the edge; performing a dissection to the edge such that the edge is divided to include two corner segments and one center segment between the two corner segments; performing a first optical proximity correction (OPC) to the main feature for a center target associated with the center segment; thereafter, performing a second OPC to the main feature for two corner targets associated with the corner segments; and thereafter, performing a third OPC to main feature for the center target, resulting in a modified design layout.

18 Claims, 10 Drawing Sheets

DISSECTION SPLITTING WITH OPTICAL PROXIMITY CORRECTION TO REDUCE CORNER ROUNDING

CROSS REFERENCE

The present disclosure is related to the following commonly-assigned U.S. patent application, the entire disclosure of which is incorporated herein by reference: U.S. patent application Ser. No. 12/884,442 filed Sep. 17, 2010 entitled "DISSECTION SPLITTING WITH OPTICAL PROXIMITY CORRECTION AND MASK RULE CHECK ENFORCEMENT".

BACKGROUND

The integrated circuit (IC) design is more challenging when semiconductor technologies are continually progressing to smaller feature sizes, such as 65 nanometers, 45 nanometers, and below. The performance of a chip design is seriously influenced by the control of resistance/capacitance (RC), timing, leakage, and topology of the metal/dielectric inter-layers.

To enhance the imaging effect when a design pattern is transferred to a wafer, optical proximity correction (OPC) is indispensable. The design pattern is adjusted to generate an image on the wafer with improved resolution.

However, patterning corner rounding is still an issue in various existing methods. Traditional methods do not take enough care on corner rounding. For N28 nodes and below, the severity of corner rounding generates many side effects with significant impact, which is unacceptable in term of device performance, quality and reliability. For example, the corner rounding generates unexpected patterning shape that may cause short-circuit, open-circuit, RC variation, device performance drift, etc. These side effects cause more serious problems for the coming nodes in the near future.

Therefore, what is needed is a method for IC design and mask making to efficiently and significantly reduce patterning corner rounding.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Figures 1, 2:
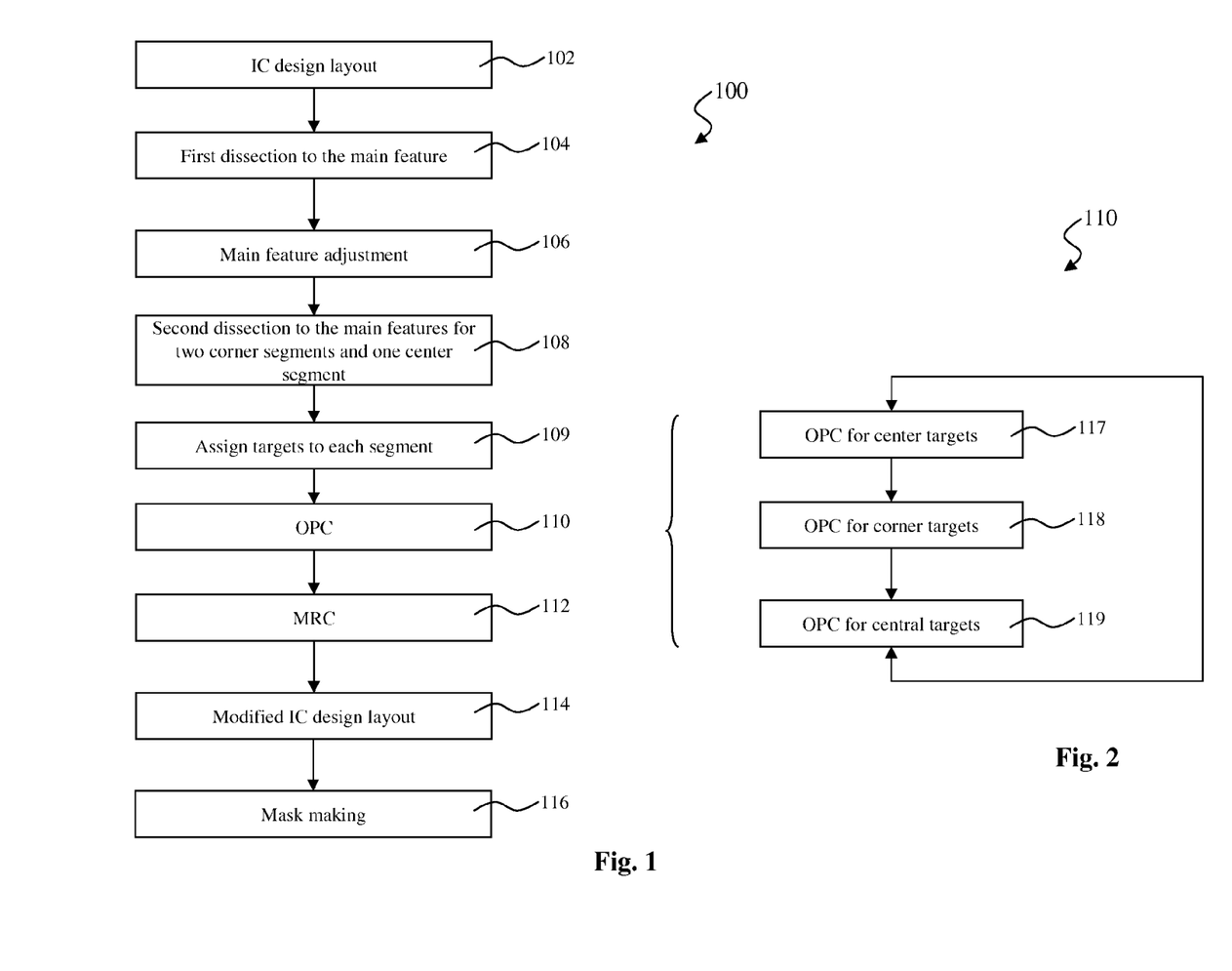
FIG. 1 is a flowchart of an embodiment of an integrated circuit (IC) design method constructed according to aspects of the present disclosure.
FIGS. 2-4 and 6-14 are schematic views of an IC design layout at various design stages and constructed according to aspects of the present disclosure.

FIG. 1 is a flowchart of a method 100 for integrated circuit (IC) designing and mask making constructed according to various aspects of the present disclosure in one or more embodiments. FIG. 2 is a flowchart of the method 100 in portion constructed according to one embodiment. FIGS. 3 through 18 illustrate schematic views of a design layout at various design stages constructed according to one or more embodiments. The method 100 is described with reference to FIGS. 1 through 18. The method 100 begins at step 102 by providing or receiving an IC design layout (or IC design pattern) from a designer. In one example, the designer can be a design house. In another example, the designer is a design team separated from a semiconductor manufacturer assigned for making IC products according to the IC design layout. In various embodiments, the semiconductor manufacturer is capable for making photomasks, semiconductor wafers, or both. The IC design layout includes various geometrical patterns designed for an IC product and based on the specification of the IC product.

The IC design layout is presented in one or more data files having the information of the geometrical patterns. In one example, the IC design layout is expressed in a "gds" format known in the art. The designer, based on the specification of the product to be manufactured, implements a proper design procedure to carry out the IC design layout. The design procedure may include logic design, physical design, and/or place and route. As an example, a portion of the IC design layout includes various IC features (also referred to as main features), such as active region, gate electrode, source and drain, metal lines or via of the interlayer interconnection, and openings for bonding pads, to be formed in a semiconductor substrate (such as a silicon wafer) and various material layers disposed over the semiconductor substrate. The IC design layout may include certain assist features, such as those features for imaging effect, processing enhancement, and/or mask identification information.

Figure 3:
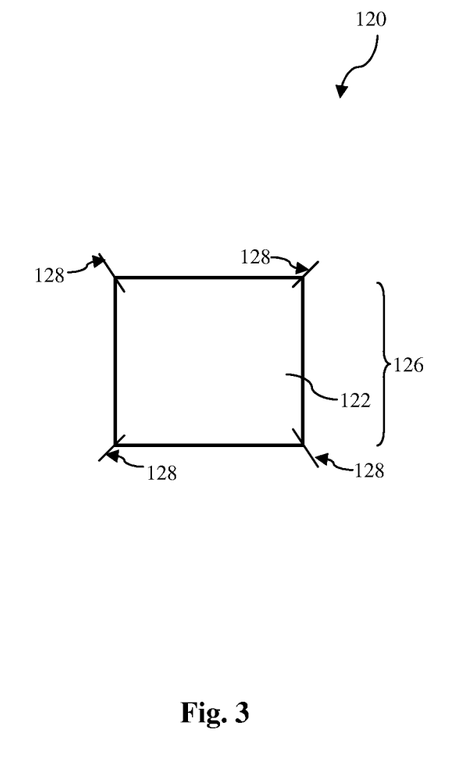

The IC design layout 120 having an exemplary main features 122 is shown in FIG. 3 for illustration. In one embodiment, the main feature is a pattern defining a contact/via hole to be formed on a semiconductor substrate. In another embodiment, the main feature 122 includes a design geometry of square. The IC design layout are fractured into a plurality of polygons (or trapezoids) for mask making. In another example, a polygon of the IC design layout is treated as a main feature.

Referring to FIGS. 1 and 3, the method 100 may proceed to step 104 by performing a first main feature dissection to the IC design layout. The first main feature dissection includes dissecting edges of a main feature into a plurality of segments.

In one embodiment, the main feature dissection is applied to the main feature 122 to generate multiple segments 126 defined by dissection points (or stitching points) 128, as illustrated in FIG. 3. In one embodiment, the dissection points are applied to the corners of the main feature 122. A portion of the edges of main feature between two adjacent dissection points defines a segment or an edge. In this case, each segment is an edge of the main feature and spans between two corners of the main feature.

In the present embodiment, the four dissection points 128 are applied to the main feature 122 at the four corners, defining four edges of the main feature 122 as respective segments by the main feature dissection. In this particular example, each segment is one side edge of the main feature 122.

Figure 4:
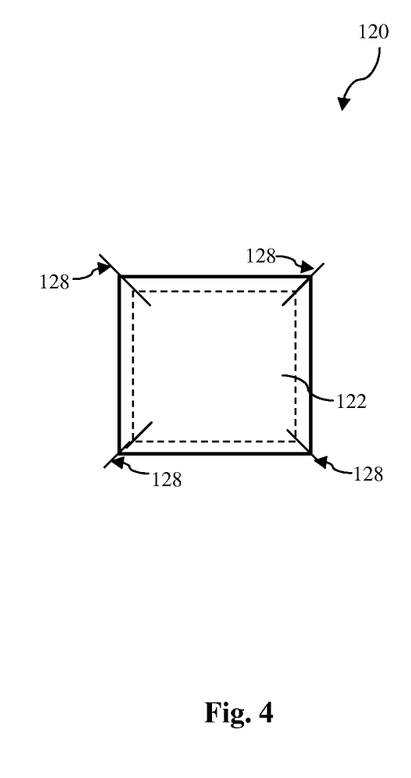

Referring to FIGS. 1 and 4, the method 100 proceeds to step 106 by performing main feature adjustment to the IC design layout 120. At the present step, the IC design layout 120 is modified/adjusted according to various manufacturing restrictions. In one embodiment, the IC design layout 120 is adjusted according to various design rules, referred to as design rule check (DRC). The various design rules can be extracted from the semiconductor manufacturer in consideration of the manufacturing capability. The IC design follows the design rules in order to generate producible circuit patterns.

The modification/adjustment to the IC design layout at this step is implemented to each edge segment generated by the main feature dissection at step 104. In one embodiment, each edge segment is evaluated by the design rules and is individually adjusted accordingly. In one example, the adjustment to an edge includes moving/relocating the edge segment such that the corresponding main feature is reshaped. The main feature dissection at step 104 is implemented for the main feature adjustment according by DRC at step 106, therefore, the main feature dissection at step 104 is also referred to as DRC main feature dissection.

As illustrated in FIG. 4, the main features 122 of the IC design layout 120 is adjusted according to the design rules such that each edge segment is moved outward from its original location (shown as dashed line). In the present example, the main features 122 is enlarged.

In another example, the IC design layout 120 is adjusted through a logic operation. In the semiconductor manufacturer, various manufacturing modules convert the manufacturing constraints into a set of rules that the IC design layout 120 has to meet. Otherwise, the IC design layout 120 will be modified accordingly such that the modified IC design layout meets these rules. Such modification is implemented at this step by a logic operation.

Figure 5:
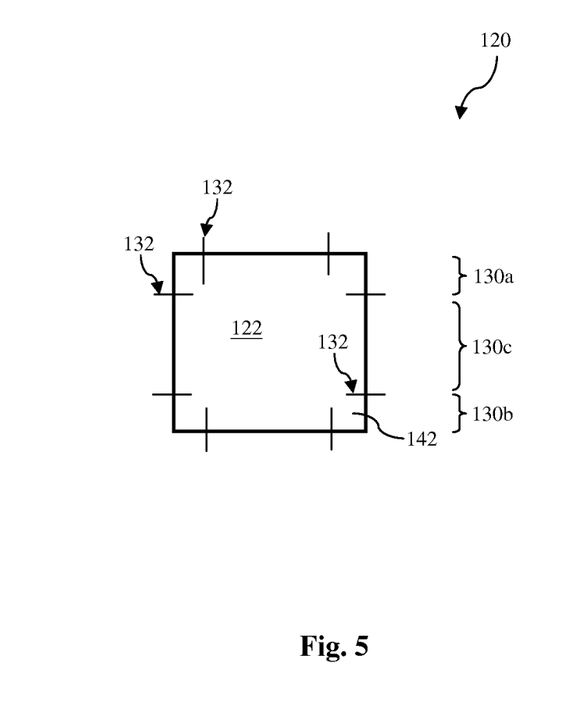
FIG. 5 is a schematic view of a main feature dissected into a plurality of sub-portions in various embodiments and constructed according to aspects of the present disclosure.

Referring to FIGS. 1 and 5, the method 100 of FIG. 1 proceeds to step 108 by performing a second main feature dissection. The second main feature dissection implemented at this step is to prepare the main features of the IC design layout for subsequent optical proximity correction (OPC) process, therefore, also referred to as OPC dissection. In the second main feature dissection, the main features in the IC design layout 120 are further dissected such that the corresponding edges are further segmented. The edges defined by the main feature dissection at step 104 are further divided into sub-segments (or simply segments) by the second main feature dissection. Particularly, by the second dissection, each edge of the main feature 122 is divided to at least three segments 130 that include a first coroner segment 130a, a second corner segment 130b and a third center segment 130c. The center segment 130c is located between the first and second corner segments 130a and 130b. Each corner segment (130a or 130b) includes a corner of the main feature 122. The corner segments and the center segment are defined by dissection points 132 as illustrated in FIG. 5.

Figure 6:
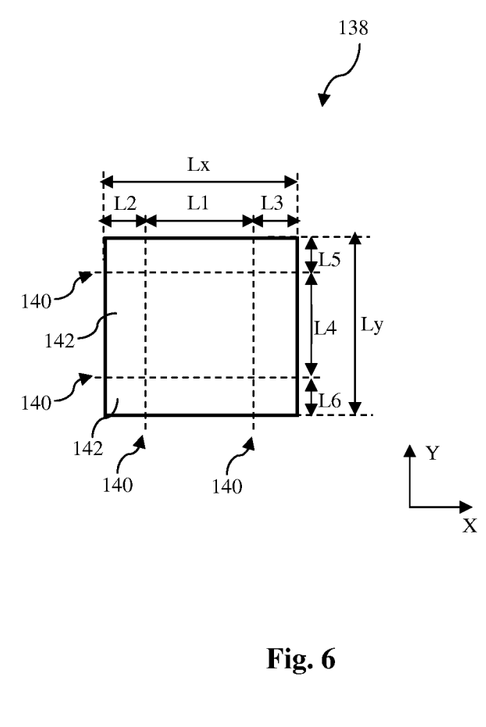

To illustrate such concept, refer to FIG. 6, which illustrates an exemplary main feature 138 for simplicity. The second main feature dissection is further described with reference to FIG. 6. Various dissection lines 140 in both x and y directions are defined to dissect the main feature 138 into multiple sub-portions 142. The IC design layout is defined in two dimensions. As an example, the main feature 138 is defined as a square in x and y directions. Considering the two dimensions of the main feature 138, the main feature is dissected in two dimensions, such as the x and y directions. In the present embodiment, the main feature 138 is dissected into three sections in each of the two dimensions. Thus, the main feature 138 is dissected into 9 sub-portions 142 as illustrated in FIG. 6.

The main feature 138 spans to a first dimension Lx in the x direction and a second dimension Ly in the y direction. Take the x direction as an example, the first dimension Lx is dissected into three (first, second and third) portions by the dissection lines 140 in the y direction. The first, second and third portions have individual sub-dimensions L1, L2 and L3, respectively. For simplicity, the first, second and third portions are referred to as L1, L2 and L3, respectively. The first portion L1 is disposed between the second and third segments L2 and L3. The second sub-dimension L2 and the third sub-dimension L3 include corners of the main feature 138. The first portion L1 excludes any corner of the main feature 138.

The second dimension Ly is dissected into three portions by the dissection lines 140 in the x direction in a way similar to the dissection applied to the first dimension Lx. For example, the second dimension Ly is dissected into three (fourth, fifth and sixth) portions. The fourth, fifth and sixth portions have individual sub-dimensions L4, L5 and L6, respectively. For simplicity, the forth, fifth and sixth portions are referred to as L4, L5 and L6, respectively. The fourth portion L4 is disposed between the fifth and sixth segments L5 and L6. The fifth sub-dimension L5 and the sixth sub-dimension L6 include corners of the main feature 138. The fourth portion L4 excludes any corner of the main feature 138.

In one example, the sub-portion 142 in the left bottom corner of the main feature 138 is a rectangle with a dimension L2 in the x direction and a dimension L6 in the y direction. In the present embodiment, the main feature 138 is dissected into 9 portions 142 by the dissection lines 140. Each portion 142 has a dimension being one of L1, L2 and L3 in the x direction, and has another dimension being one of L4, L5 and L6 in the y direction.

Accordingly, the edges of the main feature 138 are further dissected into multiple segments by the dissection lines 140. In the present embodiment, each side of the main feature 138 is dissected into three segments: two corner segments and one center segment. The second main feature dissection at step 108 further dissects each edge into multiple segments, also referred to as OPC segments.

The main feature 138 is a contact hole with a symmetric geometry. Alternatively, the main feature 138 may have other geometries, sizes, and may be symmetrical or asymmetrical. For example, the main feature 138 may be a straight metal line, a metal line with a corner, or other suitable shapes. The second main feature dissection applied to a main feature can thus be varied accordingly to accommodate the different shapes and geometries of the corresponding main feature.

Now refer to the IC design layout 120 in FIG. 5. In one embodiment, the main feature 122 is dissected into 9 sub-portions 142 by the dissection lines 132 substantially similar to the dissection applied to the main feature 138 of FIG. 6. In a different perspective, the edges of the main feature 122 are dissected into multiple segments (e.g., 130a, 103b and 130c). In this perspective, only dissection points on the edges matter. Therefore, the dissection lines 140 are simplified to dissection points 132. A main feature in the IC design layout 120 may be dissected differently, depending on the geometry and dimensions of the corresponding main feature. In one embodiment, a main feature may be dissected into a plurality of sub-portions with different dimensions in one direction. In another embodiment, when a main feature is asymmetric, the number of segments and the dimensions of the segments generated from the main feature by the dissection can be different between the first direction x and the second direction y. For example, after the second dissection at step 108, each edge includes two corner segments and more than one center segment.

Figure 7:
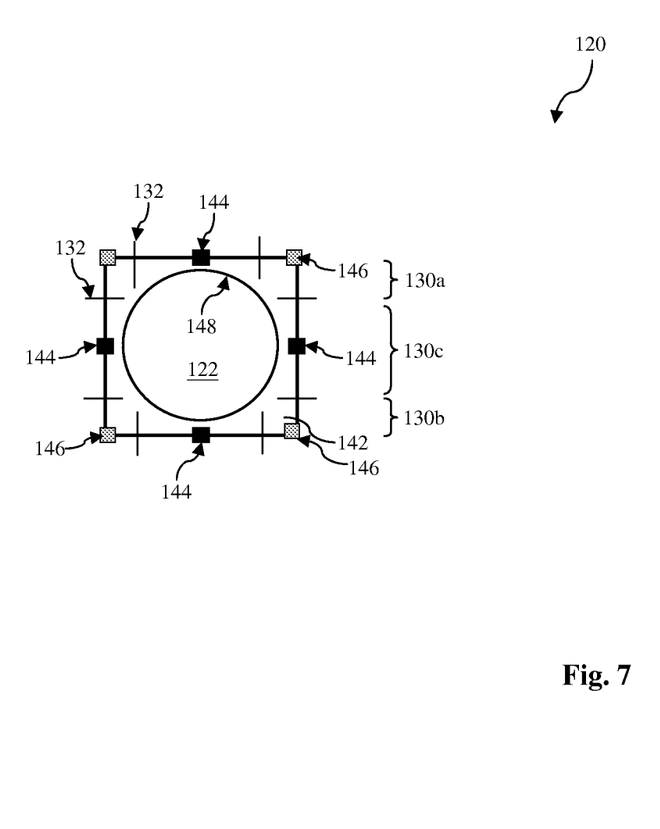

Referring to FIGS. 1 and 7, the method 100 proceeds to step 109 by assigning target points (or targets) to the respective segments. The first and second corner segments and the center segment each are assigned with respective target points.

In FIG. 7, various targets are assigned to the main feature 122, after the second main feature dissection. Various targets are assigned to the main features for simulation verification or other design purposes. The targets represent spatial locations relative to the main features. For example, the targets 144 and 146 are spatially defined in the main feature 122 of the IC design layout 120. When a simulated contour 148 of the corresponding main feature 122 is generated in a subsequent step, the defined targets to the corresponding main feature 122 are checked to verify if the targets are within or overlapped with the simulated contour 148 of the corresponding main feature 122.

In the present embodiment, each of the corner segments and the center segments is assigned a respective target. In furtherance of the embodiment, the center segments are assigned with the targets 144 and the corner segments are assigned with targets 146. The targets 144 and 146 are therefore referred to as center target 144 and corner targets 146. Take the right edge of the main feature 122 as an example, the first corner segment 130a and the second corner segment 130b are assigned respective targets 146. The center segment 130c is assigned with a target 144. In one embodiment, the targets 146 for the corner segments (130a and 130b) are positioned on the respective corners for the effectiveness to reduce or eliminate the corner rounding issue during the subsequent OPC process. In another embodiment, the target 144 for the center segment 130c is assigned on the central location of the right edge or the center segment 130c.

The method 100 proceeds to step 110 by performing an optical proximity correction (OPC) to the IC design layout 120. The OPC is performed to correct the image errors by modifying the IC design layout. The OPC process may be model-based, rule-based OPC, table-based OPC, or combinations thereof.

The OPC includes moving edges of a main feature and adding assist features to the main feature. In various embodiments, the main feature is resized, repositioned, and/or reshaped. In another embodiment, various assist features, such as scattering bars, serifs or hammerheads are added to the main feature. The assist features may be placed a distance away from the main feature (such as scattering bars) or be placed adjacent to the main feature (such as serifs and hammerheads).

Figure 8:
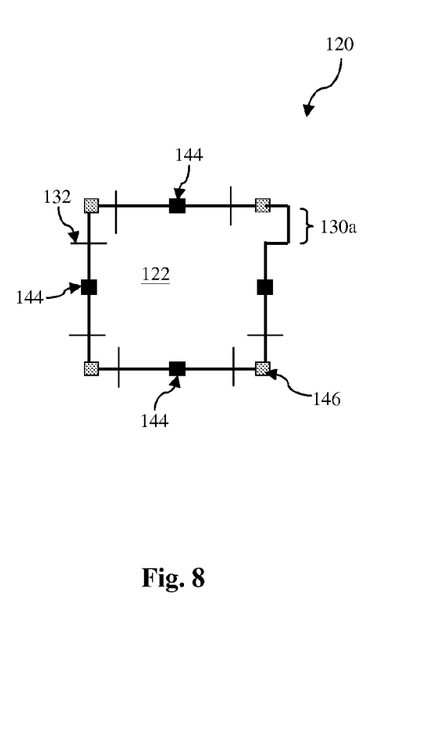
Figure 9:
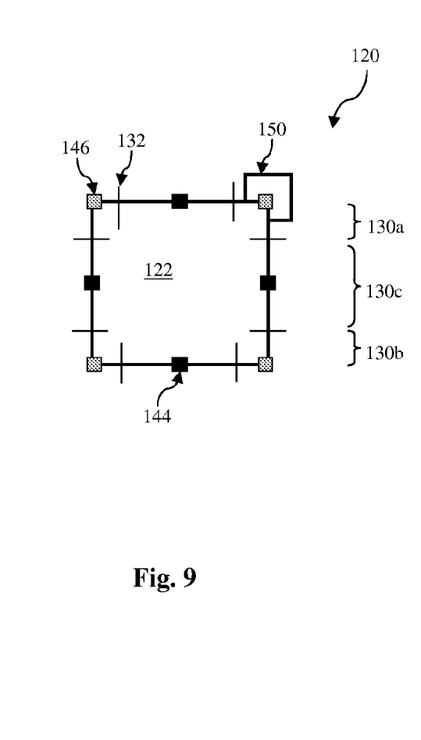
Figure 10:
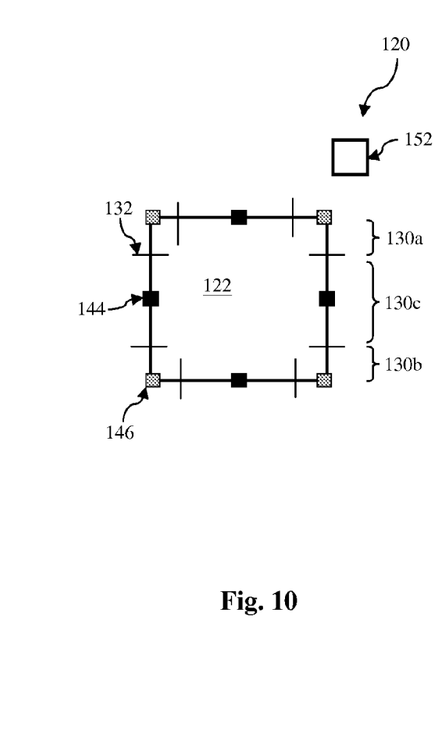

FIG. 8 illustrates an example where the segment 130a is repositioned. FIG. 9 illustrates another example where a serif feature 150 is added to the corner of the main feature 122. The serif feature 150 contacts the main feature 122 and therefore is a portion of the modified main feature 122. FIG. 10 illustrates yet another example where an assist feature 152 is added to the design layout 120 and is approximate the main feature 122. The serif feature 152 does not contact the main feature 122. In the present embodiment, the assist feature 152 is a sub-resolution feature that is dimensioned to be below the resolution of a lithography exposure tool (such as scanner) during a lithography process to transfer the design layout from a photomask to a wafer.

In one embodiment, the second dissection at step 108 may includes dissecting an edge of the main feature into more than one center segment and two corner segments. For example, the edge is dissected to two corner segments and two or more center segments that are segments between the two corner segments. In another embodiment, when more than one center segments present to the edge, one center segment is assigned with respective target. The rest center segment(s) may be assigned with targets or alternatively not assigned with target, or a subset is assigned with target and another subset is not assigned with target.

Additionally, other features may be added or other action may be applied to the IC design layout 120. For example, dummy insertion features may be added to the IC design layout 120 for enhanced chemical mechanical polishing (CMP) or other processing advantages.

Back to the step 110 in FIG. 1 for the OPC process, the OPC process includes applying OPC to the corner segments (such as 130a and 130b) and applying OPC to the center segment (such as 130c). As each OPC process step aims for tuning the design layout to meet the corresponding target that hits the respective edge or is close to the edge in an acceptable range, the corresponding OPC process step is applied to the design layout for the respective target. Furthermore, when an OPC process is applied for a target, the tuning of the design layout may not be limited to the corresponding segment and may further include other related segments. For example, when an OPC process is applied for the center target 144 on the right edge of the main feature 122, the tuning such as repositioning may include repositioning the respective center segment 130c or alternatively may include repositioning the whole edge including segments 130a, 130b and 130c.

In one embodiment, the OPC process includes an iteration process until the modified design layout 120 is capable of producing an acceptable image from the respective photomask to a wafer. The image of the design layer is determined by a simulation to simulate the imaging of the respective photomask with the design layout and is also referred to as a simulated contour, such as the contour 148 in FIG. 7.

In the present embodiment, the OPC process at step 110 includes three steps as further illustrated in the flowchart of the OPC process 110 in FIG. 2. The OPC process 110 includes a first step 117 by performing a first OPC process for the center segment (such as 130c); thereafter, a second step 118 by performing a second OPC process for the corner segments (such as 130a and 130b); and, thereafter, a third step 119 by performing a third OPC process for the center segment (130c). In furtherance of the embodiment, the OPC process 110 may be iterated until the modified design layout 120 merges to the acceptable range.

In a different perspective of the OPC process 110, the first OPC process at step 117 is applied to the design layout 122 for the center targets (such as 144); the second OPC process at step 118 is applied to the design layout 122 for the corner targets (such as 146); and the third OPC process at step 119 is applied to the design layout for the center targets (such as 144).

Figure 11:
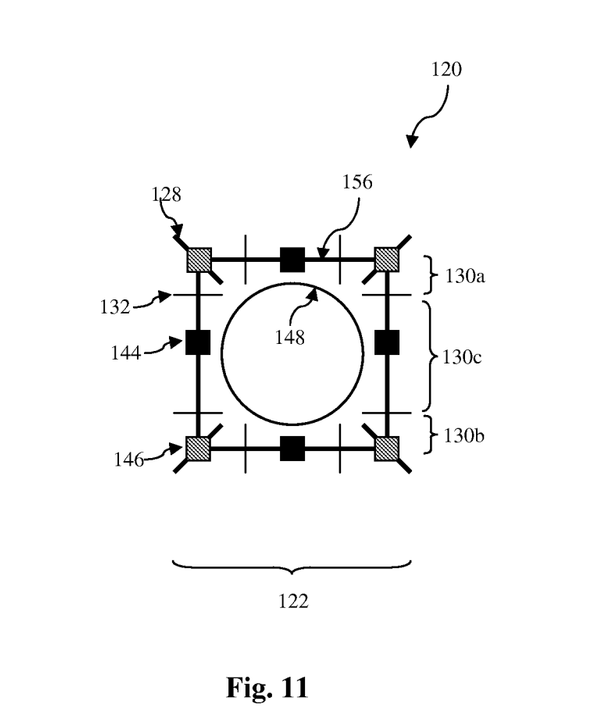

The OPC process 110 in FIG. 2 is further described with reference to FIGS. 11 through 15. Still take the main feature 122 as an example for the design layout 120. Prior to the OPC process, the design layout 120 is illustrated in FIG. 11. The simulated contour 148 is deviated from the target points 144 and 146. The edges of the main feature 122 is shown as 156 in solid line.

Figure 12:
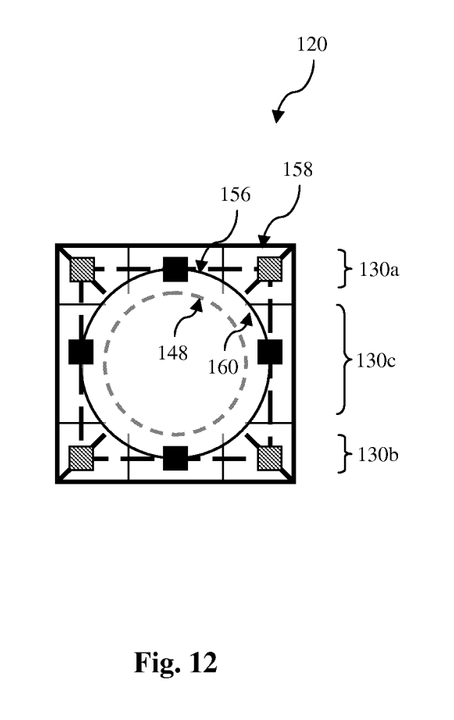

Referring to FIG. 12, the first OPC process at step 117 is applied for the center targets 144. In one embodiment, a model-based OPC is utilized. The first OPC process 117 includes an OPC technique, such as repositioning the edges of the main feature 122 from the original edges 156 (dashed lines) to the new edges 158 (solid lines) such that the center targets 144 are satisfied, meaning that the simulated contour 160 of the modified main feature 122 after the first OPC process 117 meets the requirement of center targets 144.

Figure 13:
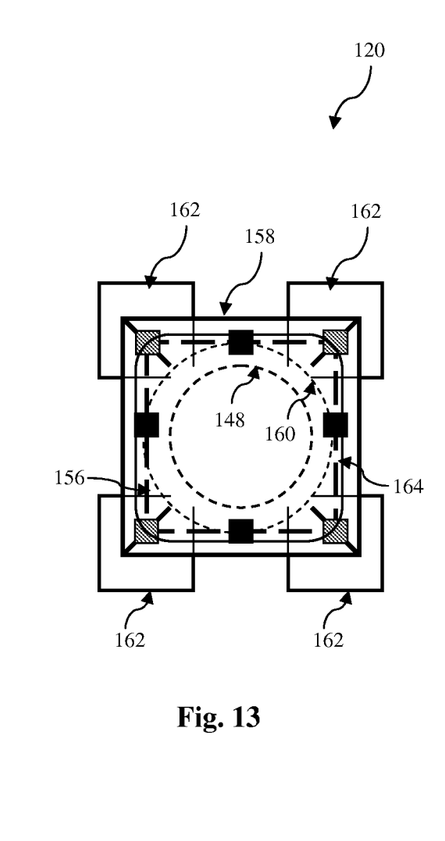

Referring to FIG. 13, the second OPC process at step 118 is applied for the corner targets 146. In one embodiment, a model-based OPC is utilized. The second OPC process 118 includes an OPC technique (including repositioning, adding a serif or an assist feature). In one example, serif features 162 are added to the corners of the main features 122 such that the corner targets 146 are satisfied. Specifically, the simulated contour 164 of the modified main feature 122 after the second OPC process 118 reduces the corner rounding and meets the corner targets 146. The new edges of the main feature 122 are collectively defined by the edges 158 and the serif features 162.

Figure 14:
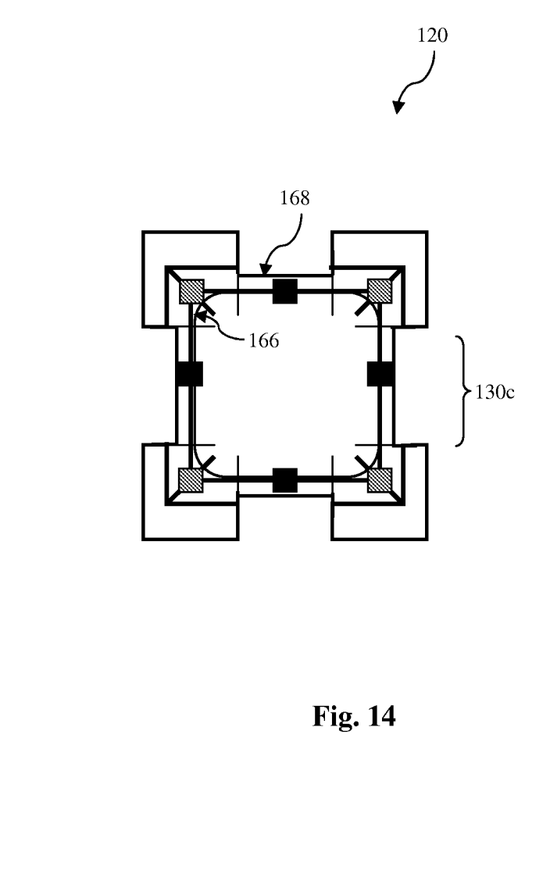
Figure 15:
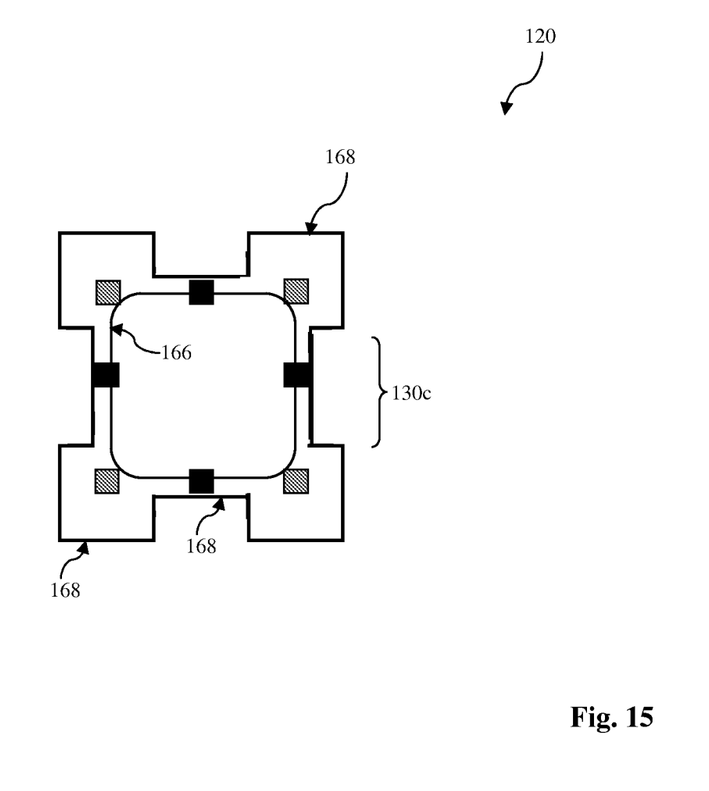
FIGS. 15 through 18 are schematic views of various IC design layouts constructed according to aspects of the present disclosure in various embodiments.

However, after the second OPC process, the center targets 144 could be missed and therefore, the third OPC process is implemented. Referring to FIG. 14, the third OPC process at step 119 is applied for the center targets 144. In one embodiment, a model-based OPC is utilized. The third OPC process 119 includes an OPC technique (including repositioning, adding a serif or an assist feature). In the present example, the center segment (such as 130c) is repositioned. Specifically, the simulated contour 166 of the modified main feature 122 after the third OPC process 119 meets the center targets 144. The new edges of the modified main feature 122 is 168 as further illustrated in FIG. 15.

In another embodiment, the OPC process may be implemented in consideration of the environmental impact, such as those features approximate the main feature 122. The environmental impact includes etching loading effect, the load effect of the lithography patterning or the pattern density of a chemical mechanical polishing (CMP) process. Those environmental impacts may be considered during the OPC process by a model convolution. In one example, the environment-induced-corner-rounding critical level may be defined by the model convolution and is incorporated in a model-based OPC process.

Figure 16:
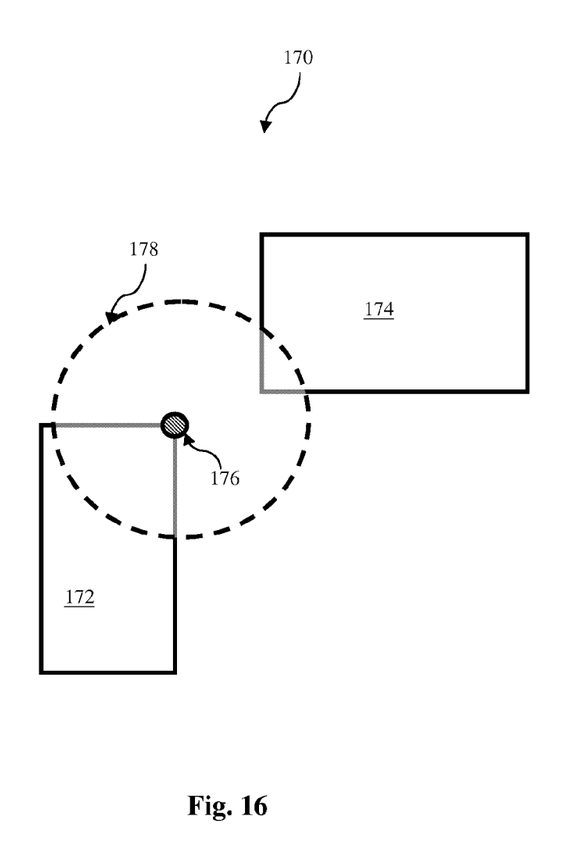
Figure 17:
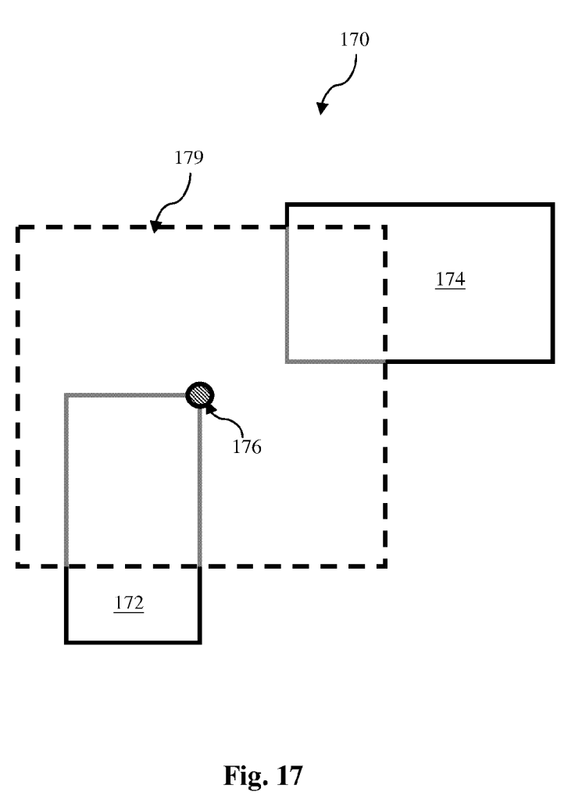

FIG. 16 illustrates a design layout 170 having a first main feature 172 and a second main feature 174 that are approximate from each other. When the OPC process is applied to the main feature 172, an impact area around a certain location 176 of the main feature 172 is defined. For example, the corner of the main feature 172 as the most close to the approximate main feature 174 is chosen, a round area 178 is defined as the impact area using the corner 176 as the center and a certain radius that is related to the environmental impact distance and may be predefined. If the approximate feature 174 is within or partially within the defined area 178, then the model-based OPC process is applied to the main feature 172 with consideration of the main feature 174. In another example illustrated in FIG. 17, a rectangle or a square area 179 is defined as the impact area.

Figure 18:
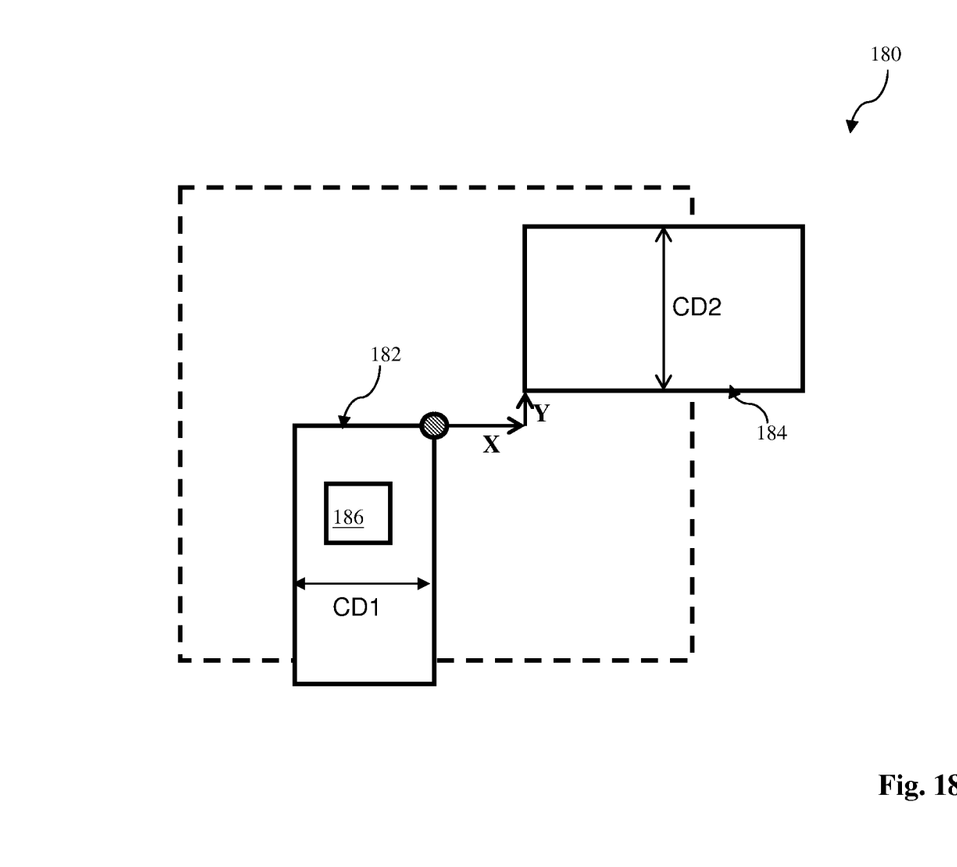

FIG. 18 illustrates a design layout 180 having a first main feature 182 and a second main feature 184 in one layer and a third main feature 186 in another layer. In one example for illustration, the main features 182 and 184 are metal lines in one metal layer and the main feature 186 is a via feature on a via layer above (or below) the metal layer. The OPC process applied to the main feature 182 needs considering the impacts of the main feature 184 from the same layer and of the main feature 186 from a different layer. For example, the via landing issue is to be considered during the OPC process applied to the main feature 182. In the present embodiment, a rule-based or a table-based environment qualification is implemented to define the environment impacts, such as the environment-induced-corner-rounding critical level using dimensional data such as CD1, CD2, X and Y for example.

Referring back to FIG. 1, the method 100 may further proceed to the step 112 by performing a mask rule check (MRC) to the IC design layout 120. At this step, the IC design layout 120 is checked by one or more mask rules and is modified accordingly. In one embodiment, various mask rules are extracted from the mask fabrication. Various mask making data are collected from the mask fabrication and extracted into a set of rules that the IC design layout, as the pattern to be imaged to a mask, should follow. In one embodiment, the MRC is implemented to the IC design layout 120 through the sub-portions of the main features. In furtherance of the present embodiment, the mask rules are applied to various segments of the main features. Those segments that fail one or more mask rules are modified according to the corresponding mask rules.

Still referring to FIG. 1, the method 100 may proceed to repeat the step 110 of performing OPC and the step 112 of performing MRC to the IC design layout until the OPC and MRC are both fulfilled. In one example, both the OPC and MRC are implemented at the sub-portion level such that the iteration can effectively converge.

In one embodiment, the IC design layout 120 is evaluated according to the OPC criteria after the MRC at step 112. If the IC design layout 120 fails the OPC evaluation, the method 100 return to step 110 to perform another optical proximity correction. Particularly, the OPC is applied to the target sub-portions such that the modified non-target sub-portions retain the changes by the MRC.

If the IC design layout 120 passes the OPC evaluation after the MRC at step 112, the method 100 may proceed to step 114 by providing a modified IC design layout 120 in a format accessible by a mask making tool, such as an e-beam mask writer. In one embodiment, the modified IC design layout 120 is expressed in a gds format. The modified IC design layout 120 includes various modifications from the OPC at the step 110 and the MRC at the step 112.

Referring to FIG. 1, the method 100 may further proceed to step 116 for the fabrication of a mask or a group of masks based on the modified IC design layout 120. In one embodiment, an e-beam or a mechanism of multiple e-beams is used to form a pattern on a mask (photomask or reticle) based on the IC design layout. The mask can be formed in various suitable technologies. In one embodiment, the mask is formed using the binary technology. In this case, the mask pattern includes opaque regions and transparent regions. The radiation beam (e.g. ultraviolet or UV beam), used to expose the image sensitive material layer (such as photoresist) coated on a wafer, is blocked by the opaque region and transmits through the transparent regions. In one example, the binary mask includes a transparent substrate (e.g., fused quartz), and an opaque material (e.g., chromium) coated in the opaque regions of the mask. In another embodiment, the mask is formed using a phase shift technology. In the phase shift mask (PSM), various features in the pattern formed on the mask are configured to have proper phase difference to enhance the resolution and imaging quality. In various examples, the PSM can be an attenuated PSM or an alternating PSM known in the art.

Other processing steps may follow after the formation of the mask. In this embodiment, a semiconductor wafer is fabricated using a mask or a set of masks formed by the above method. The semiconductor wafer includes a silicon substrate or other proper substrate and material layers formed thereon. Other proper substrate may alternatively be made of some suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide.

The semiconductor wafer may further include various doped regions, dielectric features, and multilevel interconnects (or are formed at subsequent manufacturing steps). In one example, the mask is used in an ion implantation process to form various doped regions in the semiconductor wafer. In another example, the mask is used in an etching process to form various etching regions in the semiconductor wafer. In another example, the mask is used in a deposition process, such as chemical vapor deposition (CVD) or physical vapor deposition (PVD), to form a thin film in various regions on the semiconductor wafer. Various manufacturing data may be collected from various manufacturing processes including CVD, PVD, etching, ion implantation and a lithography process from the previously processed semiconductor wafers, processing tools, and metrology tools.

Other embodiments and modifications may be implemented without departing from the spirit of the present disclosure.

Thus, the present disclosure provides an integrated circuit (IC) method. The method includes receiving an IC design layout having an main feature, the main feature including two corners and an edge spanning between the two corners; performing a feature adjustment to the edge; performing a dissection to the edge such that the edge is divided to include two corner segments and one center segment between the two corner segments; performing a first optical proximity correction (OPC) to the main feature for a center target associated with the center segment; thereafter, performing a second OPC to the main feature for two corner targets associated with the corner segments; and thereafter, performing a third OPC to main feature for the center target, resulting in a modified design layout.

In one embodiment, the method further includes repeating the first OPC, the second OPC and the third OPC at least one more time.

In another embodiment, the method further includes performing a mask rule check (MRC) to the main feature of the IC design layout after the performing of the third OPC. In yet another embodiment, the performing the MRC includes modifying one of the corner segments and the center segment according to a mask rule.

In another embodiment, the performing of the second OPC includes repositioning at least one of the corner segments. In yet another embodiment, the performing of the second OPC includes adding a serif feature to respective corner of the main feature.

In yet another embodiment, the performing of the second OPC includes adding an assist feature approximate respective corner of the main feature and spaced from the main feature, the assist feature being a sub-resolution feature.

In yet another embodiment, the method further includes assigning the two corner targets to the two corners of the two corner segments, respectively.

In yet another embodiment, the method further includes assigning the center target and the two corner targets to the center segment and the two corner segments, respectively.

In yet another embodiment, the method further includes making a photomask based on the modified design layout.

The present disclosure also provides another embodiment of an integrated circuit (IC) method. The method includes receiving an IC design layout having a main feature, the main feature including first and second corners and an edge spanning between the first and second corners; performing a dissection to the edge of the main feature, thereby generating a center segment, a first corner segment and a second corner segment; assigning a first corner target, a second corner target and a center target to the first corner segment, the second corner segment and the center segment of the main feature, respectively; and performing an optical proximity correction (OPC) process to the IC design layout.

In one embodiment of the method, the assigning the first, second and third targets includes assigning the first corner target to the first corner; and assigning the second corner target to the second corner.

In another embodiment, the assigning the first, second and third targets comprising assigning the center target to a central location of the edge.

In yet another embodiment, the performing an OPC process includes applying a first OPC sub-process for the center target; thereafter, performing a second OPC sub-process for the first and second corner targets; and thereafter, performing a third OPC sub-process for the center target. The performing an OPC process may include iterating the first, second and third OPC sub-processes.

In yet another embodiment, the method further includes performing an adjustment to the edge of the main feature according design rule check (DRC) before the performing of the OPC process.

In yet another embodiment, the method further includes performing a mask rule check (MRC) to the main feature after the performing of the OPC process.

In yet another embodiment, the performing of the OPC process includes performing OPC considering environment impact from an approximate feature of the design layout.

In yet another embodiment, the performing of the OPC process includes performing model-based OPC considering environment impact from an approximate feature of a different layer in the design layout.

The present disclosure also provides another embodiment of an integrated circuit (IC) design method. The method includes receiving an IC design layout having a main feature; performing a first dissection to the main feature, defining an edge of the main feature, wherein the edge ends at two corners of the main feature; performing an adjustment to the edge according to a design rule; performing a second dissection to the edge of the main feature, splitting the edge into a first corner segment, a second corner segment and a center segment that is disposed between the first and second corner segments; assigning a first corner target, a second corner target and a center target to the first corner portion, the second corner portion and the center portion of the main feature, respectively; and performing an optical proximity correction (OPC) process to the IC design layout.

In one embodiment of the method, the performing an OPC process includes performing a first OPC sub-process to the main feature for the center target; thereafter, performing a second OPC sub-process to the main feature for the first and second corner targets; and thereafter, performing a third OPC sub-process to the main feature for the center target. In another embodiment, the performing of the second OPC sub-process includes one of repositioning, adding a serif feature and adding an assist feature.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) method comprising:
receiving an IC design layout having a main feature, the main feature including a first, second and third edge defining a first corner defined by an intersection of a first and second edges and a second corner defined by an intersection of the second and third edges;
performing a dissection to the second edge such that the second edge is divided to include two corner segments and a center segment between the two corner segments;
after performing the dissection, assigning a plurality of targets to the main feature, wherein the assigning includes:
assigning a first target at a center point in the center segment of the second edge and a second target at a center point of the first edge;
assigning a third target at the first corner and a fourth target at the second corner;
assigning a fifth target at a central point on the second edge between the third target;
after assigning the first, second, third, fourth and fifth targets, performing a first optical proximity correction (OPC) to the main feature for the first and second targets, and not the third, fourth, and fifth targets;
thereafter, performing a second OPC to the main feature for the third target and the fourth target, and not the first, second, and fifth targets; and
thereafter, performing a third OPC to the main feature for the fifth target, and not the first, second, third, and fourth targets, resulting in a modified IC design layout; and
providing the modified IC design layout in a format accessible by a mask making tool.

2. The method of claim 1, further comprising repeating the first OPC, the second OPC, and the third OPC at least one more time.

3. The method of claim 1, further comprising performing a mask rule check (MRC) to the main feature of the IC design layout after the performing of the third OPC.

4. The method of claim 3, wherein the performing the MRC includes modifying one of the corner segments and the center segment according to a mask rule.

5. The method of claim 1, wherein the performing of the second OPC includes repositioning at least one of the corner segments.

6. The method of claim 1, wherein the performing of the second OPC includes adding a serif feature to a respective corner of the main feature.

7. The method of claim 1, wherein the performing of the second OPC includes adding an assist feature approximate a respective corner of the main feature and spaced from the main feature, the assist feature being a sub-resolution feature.

8. The method of claim 1, further comprising making a photomask based on the modified IC design layout.

9. An integrated circuit (IC) method comprising:
receiving an IC design layout having a main feature, the main feature including first and second corners and an edge spanning between the first and second corners;
performing a dissection to the edge of the main feature, thereby generating a center segment, a first corner segment, and a second corner segment;
assigning a first corner target, a second corner target, and a center target to the first corner segment, the second corner segment, and the center segment of the main feature, respectively;
after assigning the targets, performing a plurality of sequential optical proximity correction (OPC) processes to the IC design layout; wherein the performing the plurality of sequential OPC processes includes providing the IC design layout in a format accessible by a mask making tool and wherein the plurality of sequential OPC processes includes a first OPC process for the center target and not the first and second corner targets, and thereafter, a second OPC process for the first and second corner targets and not the center target.

10. The method of claim 9, wherein the assigning the first, second, and third targets includes:
assigning the first corner target to the first corner; and
assigning the second corner target to the second corner.

11. The method of claim 10, wherein the assigning the first, second, and third targets includes assigning the center target to a central location of the edge.

12. The method of claim 9, wherein the performing the plurality of sequential OPC processes includes iterating the first and second OPC processes.

13. The method of claim 9, further comprising performing an adjustment to the edge of the main feature according to a design rule check (DRC) before the performing of the plurality of sequential OPC processes.

14. The method of claim 9, further comprising performing a mask rule check (MRC) to the main feature after the performing of the plurality of sequential OPC processes.

15. The method of claim 9, wherein the performing of the plurality of sequential OPC processes includes performing OPC considering environment impact from an approximate feature of the design layout.

16. The method of claim 9, wherein the performing of the plurality of sequential OPC processes includes performing model-based OPC considering environment impact from an approximate feature of a different layer in the design layout.

17. An integrated circuit (IC) design method comprising:
receiving an IC design layout having a main feature;
performing a first dissection to the main feature, defining an edge of the main feature, wherein the edge ends at two corners of the main feature;
performing a second dissection to the defined edge of the main feature, splitting the defined edge into a first corner segment, a second corner segment, and a center segment that is disposed between the first and second corner segments;
assigning a first corner target, a second corner target, and a center target to the first corner segment, the second corner segment, and the center segment of the main feature, respectively, wherein the first and second corner targets are disposed at an intersection of the defined edge and a respective adjacent edge of the main feature; and
performing an optical proximity correction (OPC) process to the IC design layout, wherein the OPC process includes:
performing a first OPC sub-process to the main feature for the center target;
thereafter, performing a second OPC sub-process to the main feature for the first and second corner targets; and thereafter, performing a third OPC sub-process to the main feature for the center target; and wherein the performing the OPC includes providing the IC design layout in a format accessible by a mask making tool.

18. The method of claim 17, wherein the performing of the second OPC sub-process includes one of repositioning, adding a serif feature, and adding an assist feature.

* * * * *